(12) United States Patent
Aoyama et al.

(10) Patent No.: US 10,646,952 B2
(45) Date of Patent: May 12, 2020

(54) PROJECTION BOLT WELDING METHOD

(71) Applicant: Shoji Aoyama, Osaka (JP)

(72) Inventors: Shoji Aoyama, Osaka (JP); Yoshitaka Aoyama, Osaka (JP)

(73) Assignee: Shoji Aoyoma, Osaka (JP)

( * ) Notice: Subject to any disclaimer, the term of this patent is extended or adjusted under 35 U.S.C. 154(b) by 0 days.

(21) Appl. No.: 14/901,325

(22) PCT Filed: May 27, 2014

(86) PCT No.: PCT/JP2014/063958
§ 371 (c)(1),
(2) Date: Dec. 28, 2015

(87) PCT Pub. No.: WO2015/001872
PCT Pub. Date: Jan. 8, 2015

(65) Prior Publication Data
US 2016/0136752 A1    May 19, 2016

(30) Foreign Application Priority Data

Jul. 2, 2013   (JP) .................................. 2013-152065
Aug. 1, 2013   (JP) .................................. 2013-170770

(51) Int. Cl.
*B23K 11/14*   (2006.01)
*B23K 11/16*   (2006.01)
(Continued)

(52) U.S. Cl.
CPC .......... *B23K 11/14* (2013.01); *B23K 11/0053* (2013.01); *B23K 11/16* (2013.01);
(Continued)

(58) Field of Classification Search
CPC ..... B23K 11/14; B23K 11/0053; B23K 11/16; B23K 11/002; B23K 11/255;
(Continued)

(56) References Cited

U.S. PATENT DOCUMENTS 3,435,871 A * 4/1969 Johnson ................. B23K 11/14
411/171
5,508,488 A * 4/1996 Aoyama ............ B23K 11/0053
219/93

(Continued)

FOREIGN PATENT DOCUMENTS

DE       41 08 947      9/1992
JP       2007-218419    8/2007
(Continued)

OTHER PUBLICATIONS

International Search Report dated Sep. 9, 2014 in International (PCT) Application No. PCT/JP2014/063958.
(Continued)

*Primary Examiner* — Ibrahime A Abraham
*Assistant Examiner* — Justin C Dodson
(74) *Attorney, Agent, or Firm* — Wenderoth, Lind & Ponack, L.L.P.

(57) ABSTRACT

Provided is a projection bolt welding method, which involves welding a projection bolt to a steel sheet component by electric resistance welding. The projection bolt includes a shank, a circular enlarged diameter portion, and a welding projection including an initial fusion portion with a tapered portion and a main fusion portion. A ratio of a volume of the initial fusion portion to a volume of a portion of the steel sheet component having the same diameter as a diameter of the initial fusion portion is selected, or a ratio of a circular area of the initial fusion portion to a sheet thickness of the steel sheet component is selected.

3 Claims, 6 Drawing Sheets

(52) U.S. Cl.
CPC ...... *B23K 35/0255* (2013.01); *B23K 35/0288* (2013.01); *B23K 2101/18* (2018.08); *B23K 2103/04* (2018.08); *F16B 37/061* (2013.01)

(58) Field of Classification Search
CPC ... B23K 11/115; B23K 11/11; B23K 35/0255; B23K 35/0288; B23K 201/18; B23K 2203/04; B23K 9/202; F16B 37/061
USPC ......... 219/117.1, 93, 86.1, 86.51, 86.7, 86.9, 219/98, 99
See application file for complete search history.

(56) References Cited

U.S. PATENT DOCUMENTS

| | | | | |
|---|---|---|---|---|
| 6,008,463 | A * | 12/1999 | Aoyama | B23K 11/004 219/119 |
| 6,653,590 | B1 * | 11/2003 | Aoyama | B23K 11/14 219/86.25 |
| 2006/0070981 | A1 * | 4/2006 | Aoyama | B23K 11/0053 219/93 |
| 2007/0295698 | A1 * | 12/2007 | Hengel | B23K 11/0053 219/93 |
| 2009/0261075 | A1 * | 10/2009 | Aoyama | B23K 11/0053 219/93 |

FOREIGN PATENT DOCUMENTS

| | | |
|---|---|---|
| JP | 4032313 | 1/2008 |
| JP | 2011-51013 | 3/2011 |

OTHER PUBLICATIONS

International Preliminary Report on Patentability and Written Opinion of the International Searching Authority dated Jan. 5, 2016 in International (PCT) Application No. PCT/JP2014/063958.

\* cited by examiner

FIG. 1A
FIG. 1B
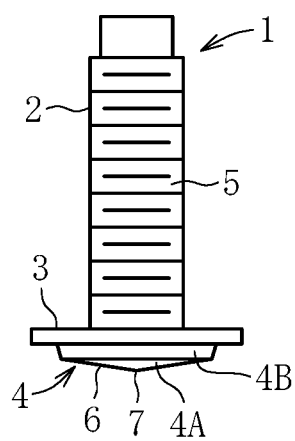
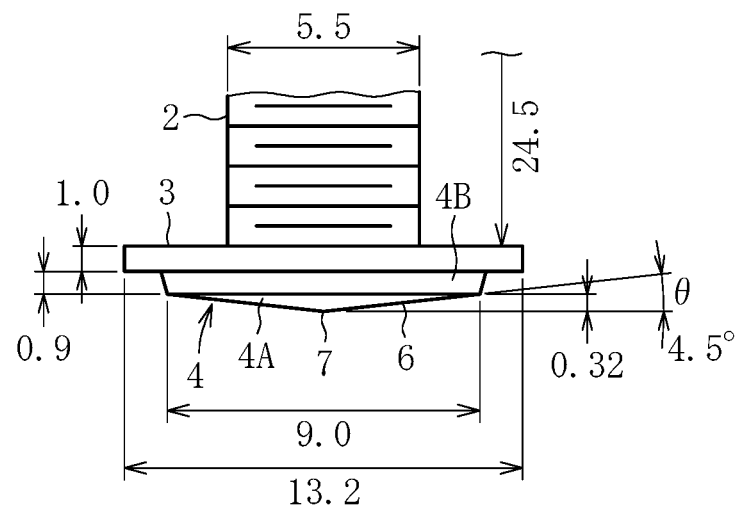
FIG. 2
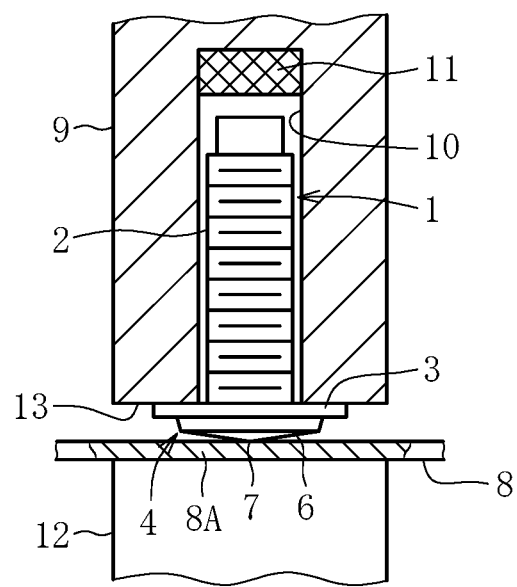

FIG. 10A
FIG. 10B
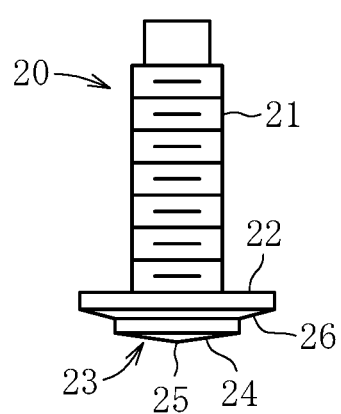
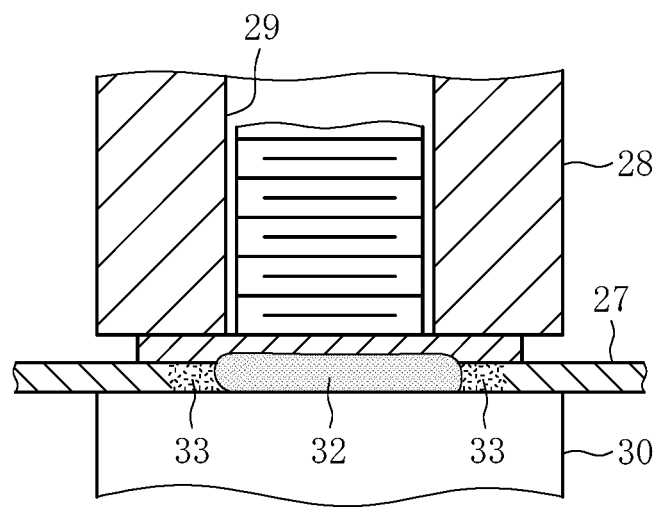

PROJECTION BOLT WELDING METHOD

TECHNICAL FIELD

The present invention relates to a method of welding, to a steel sheet, a projection bolt comprising a shank, an enlarged diameter portion formed integrally with the shank, and a welding projection arranged at a center of the enlarged diameter portion.

BACKGROUND ART

In Japanese Patent No. 4032313 (Patent Literature 1), there is described that a projection bolt including a shank, an enlarged diameter portion formed integrally with the shank, and a welding projection arranged at a center of the enlarged diameter portion is welded to a steel sheet component by electric resistance welding.

The projection bolt disclosed in Patent Literature 1 has a shape illustrated in FIG. 10A. A projection bolt 20 of FIG. 10A is made of iron, and includes a shank 21 having an external thread formed therein, a circular enlarged diameter portion 22 formed integrally with the shank 21 and having a diameter larger than a diameter of the shank 21, and a circular welding projection 23 arranged at a center of the enlarged diameter portion on a side opposite to the shank 21. The welding projection 23 is a circular bulged portion having a diameter smaller than the diameter of the enlarged diameter portion 22, and includes a tapered portion 24 formed on a distal end surface side thereof at a small inclination angle, and a vertex 25 having a pointed center portion. An end surface of the enlarged diameter portion 22 excluding the welding projection 23 is formed into a tapered surface 26 reduced in height as approaching to an outer peripheral side thereof.

CITATION LIST

Patent Literature 1: JP 4032313 B2

SUMMARY OF INVENTION

Technical Problem

The invention described in Patent Literature 1 (hereinafter referred to as related invention) is put to practical use by Yoshitaka Aoyama and Shoji Aoyama, who are inventors of the invention of the subject patent application. The above-mentioned inventors succeeded in putting the related invention to practical use by welding the projection bolt to a steel sheet component of a body of an automobile. That is, the welding projection 23 is fusion-bonded to a steel sheet component 27 at the center portion of the enlarged diameter portion 22, and the tapered surface 26 is held in close contact with a surface of the steel sheet component 27. The fusion bond at the center portion and the close contact at the remaining portion, namely, "center fusion bond and entire surface close contact" ensure welding quality that achieves a predetermined fusion state and welding strength.

Incidentally, for example, in the field of a body of an automobile, as important measures to achieve a lightweight body, thinning is promoted through increase in strength of a steel sheet such as a high-tensile steel sheet. Along with this thinning, special technical consideration is also needed in electric resistance welding of the projection bolt.

The situation is illustrated in FIG. 10B. A reception hole 29 is formed in a movable electrode 28 that is moved forward and backward. The shank 21 is inserted into the reception hole 29 so that the projection bolt 20 is held in the movable electrode 28. On the other hand, the steel sheet component 27 made of a high-tensile steel sheet is placed on a stationary electrode 30. The movable electrode 28 is moved forward toward the stationary electrode 30 so that the welding projection 23 is pressurized against the steel sheet component 27 and welding current is caused to flow. In this manner, the welding projection 23 and the steel sheet component 27 are fused, and the bolt 20 is welded to the steel sheet component 27 as illustrated in FIG. 10B.

The fusion-bonded state illustrated in FIG. 10B is abnormal. In this case, a shaded fused portion 32 is formed in an entire region of a sheet thickness of the steel sheet component 27. That is, in a thickness direction of the steel sheet component 27, the entire sheet thickness is once fused and then solidified. Such a phenomenon of excessive fusion easily occurs when the sheet thickness is as small as, for example, 0.65 mm or 0.7 mm. Such a phenomenon is considered to occur because a large amount of heat on the projection bolt 20 side affects a small sheet thickness with a small heat capacity. That is, a fusion volume on the projection bolt 20 side is extremely large with respect to that of a thin sheet. Further, even when correctly controlling the volume of the fused metal and welding conditions such as a pressurization force, an energization time period, and a current value, excessive fusion occurs in the entire region of the sheet thickness due to the thin sheet.

Normally, when a bolt or a nut is welded to the steel sheet component by electric resistance welding, a fusion range of the steel sheet in the sheet thickness direction of the steel sheet component is set to fall within a half or two-thirds of the sheet thickness, thereby ensuring required welding strength. That is, a base material corresponding to an unfused portion is secured. The reason why welding strength can be ensured in this manner is considered as follows. Specifically, the fusion range falls within the above-mentioned region, and hence an unfused base material portion keeps strength of the steel sheet itself, and a boundary area between the fused portion and the unfused portion is widened, with the result that joining strength between the fused portion and the unfused portion has a sufficient value.

However, in a case of the fusion in the entire region of the thickness as illustrated in FIG. 10B, there is a problem in that welding strength between the bolt 20 and the steel sheet component 27 cannot be ensured sufficiently.

This problem is considered to occur for the following reason. The fused portion (nugget) 32 is solidified by quenching performed after completion of energization. Accordingly, the fused portion 32 is transformed into martensite structure, thereby having significantly high hardness and brittle property. Further, a structure transformed portion indicated by the dotted pattern in FIG. 10B appears in a region near the fused portion 32. The region indicated by the dotted pattern is generally known as a heat affected zone (HAZ). The region is denoted by reference numeral 33. The region 33 is less brittle than the fused portion 32, but has more brittle property than that of the base material portion.

When a bending force is repeatedly applied to the bolt 20 so as to incline the bolt 20 with respect to the fixed steel sheet component 27, stress is concentrated on a boundary region between the structure transformed portion 33 and the fused portion 32 having high hardness and brittle property. Thus, a fracture occurs in the boundary region due to fatigue. Alternatively, a fracture occurs in the structure transformed portion 33. In addition, a cause of this problem is considered as follows. Specifically, the steel sheet component has a small sheet thickness, and hence the area of the boundary portion between the fused portion 32 and the unfused portion is small. Further, an interface is formed along the sheet thickness direction, and hence a fracture is easily caused in the boundary portion, with the result that welding strength is not enhanced.

In addition, it is necessary to optimize the above-mentioned fusion amount in the sheet thickness direction, and to solve a problem of coating property at a vicinity of an outer periphery of the enlarged diameter portion, thereby coping with occurrence of rust.

The present invention has been proposed in order to solve the above-mentioned problems, and has an object to provide a projection bolt welding method capable of preventing fusion in an entire region of a sheet thickness of a steel sheet component with a focus on a relationship between a volume of a partially shaped portion of a projection bolt and a volume of a predetermined region of the steel sheet component, or on a relationship between a fusion area of a welding projection and the sheet thickness of the steel sheet component.

In the following description, the projection bolt is sometimes simply referred to as a bolt.

Solution to Problem

According to a first aspect of the present invention, there is provided a projection bolt welding method, which involves welding a projection bolt to a steel sheet component made of a thin steel sheet by electric resistance welding under a state in which a circular welding projection of the projection bolt is pressurized against the steel sheet component between a pair of electrodes, the projection bolt comprising:
a shank having an external thread formed therein;
a circular enlarged diameter portion being formed integrally with the shank and having a diameter larger than a diameter of the shank; and
the circular welding projection arranged at a center of the circular enlarged diameter portion on a side opposite to the shank, the circular welding projection comprising:
a circular initial fusion portion comprising a tapered portion that is formed on an end surface of the circular initial fusion portion and reduced in height as approaching to an outer peripheral side of the circular initial fusion portion at a small inclination angle; and
a main fusion portion continuous with the circular initial fusion portion, the pair of electrodes comprising an electrode for holding the projection bolt and an electrode on which the steel sheet component is to be placed, the electrodes being arranged coaxially with each other, the projection bolt welding method comprising:
adding fusion heat of the main fusion portion to the circular initial fusion portion transformed into a flat fused region at an initial stage of fusion, or progressing fusion of the steel sheet component due to pressure of fused metal sealed between the main fusion portion and an unfused portion of the steel sheet component, to thereby prevent excessive fusion or insufficient fusion of the steel sheet component in a sheet thickness direction of the steel sheet component; and
securing a clearance between a vicinity of an outer periphery of the circular enlarged diameter portion and a surface of the steel sheet component after completion of the welding, to thereby discharge air in the clearance to enable a coating liquid to adhere to portions which define the clearance, including a lower surface of the circular enlarged diameter portion, an outer peripheral surface of the main fusion portion, an exposed portion of a fused portion, the surface of the steel sheet component.

Advantageous Effects of Invention

In the above-mentioned configuration, the adding the fusion heat of the main fusion portion to the initial fusion portion transformed into the flat fused region at the initial stage of the fusion is abbreviated as "fusion heat addition". Further, in the above-mentioned configuration, the progressing the fusion of the steel sheet component due to the pressure of the fused metal sealed between the main fusion portion and the unfused portion of the steel sheet component is abbreviated as "pressure use".

As described above, the object of the invention of the subject application is achieved by any one of a welding method comprising the "fusion heat addition", and a welding method comprising the "pressure use". The "fusion heat addition" is carried out in such a manner that fusion of the steel sheet component in the sheet thickness direction is complemented by an amount of heat from the main fusion portion. Further, the "pressure use" is carried out in such a manner that fusion of the steel sheet component in the sheet thickness direction is progressed due to the pressure of the sealed fused metal.

Further, as described later, the "fusion heat addition" and the "pressure use" can be combined so as to be utilized as concurrent phenomena.

Firstly, operations and effects of the welding method comprising the former "fusion heat addition" are described.

The welding projection comprises the initial fusion portion comprising the tapered portion formed on the end surface thereof and reduced in height as approaching to the outer peripheral side thereof at the small inclination angle, and the main fusion portion continuous with the initial fusion portion. Accordingly, fusion of the surface of the steel sheet component is started simultaneously with fusion of a voluminal portion of the initial fusion portion. At the same time, fusion of the main fusion portion is also progressed. At this time, when the volume of the initial fusion portion is large, an amount of fusion heat of the initial fusion portion itself is large. Accordingly, in proportion to the amount of fusion heat, a fusion amount on the steel sheet component side is also increased. In addition to the increase of the fusion amount on the steel sheet component side, a larger amount of fusion heat of the main fusion portion is applied to the steel sheet component via the initial fusion portion having the large volume. As described above, when the fusion heat of the initial fusion portion having the large volume and the fusion heat of the main fusion portion are synergistically applied to the steel sheet component, the steel sheet component is fused in an entire region of the sheet thickness thereof. That is, it is essential to avoid setting the volume of the initial fusion portion to an extremely large volume with respect to that of the steel sheet component.

On the other hand, as described above, the fusion of the surface of the steel sheet component is started simultaneously with the fusion of the voluminal portion of the initial fusion portion, and the fusion of the main fusion portion is also progressed. At this time, when the volume of the initial fusion portion is small, the amount of fusion heat of the initial fusion portion itself is small. Accordingly, in proportion to the amount of fusion heat, the fusion amount on the steel sheet component side is also reduced. In addition to the reduction of the fusion amount on the steel sheet component side, a smaller amount of the fusion heat of the main fusion portion is applied to the steel sheet component via the initial fusion portion having the small volume. As described above, when the fusion heat of the initial fusion portion having the small volume and the fusion heat of the main fusion portion are synergistically applied to the steel sheet component, an amount of heat applied to the steel sheet component is extremely small, and the steel sheet component is only slightly fused in the sheet thickness direction. That is, it is essential to avoid setting the volume of the initial fusion portion to an extremely small volume with respect to that of the steel sheet component.

In this case, importance is placed on such a point that the volume of the initial fusion portion is matched to a volume of which portion of the steel sheet component. In the present invention, the volume of a portion of the steel sheet component having the same diameter as that of the circular initial fusion portion is matched to the volume of the initial fusion portion. The volume of the portion of the steel sheet component having the same diameter as that of the circular initial fusion portion is most directly and thermally affected at the time of start of fusion of the initial fusion portion. The steel sheet component is matched to the initial fusion portion and marked off into a circular portion in this manner. Thus, a thermal effect from the initial fusion portion side can be quantitatively specified. In other words, the importance of the present invention lies in finding that the volume of the initial fusion portion itself, which is matched to the volume of the portion of the steel sheet component having the same diameter as that of the circular initial fusion portion, directly affects a fused region of the steel sheet component.

In view of the above, a ratio of the volume of the initial fusion portion to the volume of the portion of the steel sheet component having the same diameter as that of the circular initial fusion portion is set to a predetermined value. The predetermined ratio is set to from 0.08, which corresponds to a lower limit predetermined value of the fusion amount of the steel sheet component in the sheet thickness direction obtained by addition of fusion heat of the main fusion portion, to 0.20, which corresponds to a value not exceeding an upper limit predetermined value of the fusion amount of the steel sheet component in the sheet thickness direction obtained by addition of fusion heat of the main fusion portion. When the fusion heat of the main fusion portion is applied to the steel sheet component via the initial fusion portion, the volume of the initial fusion portion is properly selected for the volume of the circular portion of the steel sheet component, thereby being capable of ensuring the above-mentioned satisfactory fusion amount in the sheet thickness direction.

The volume of the portion of the steel sheet component having the same diameter as that of the circular initial fusion portion is hereinafter abbreviated as "steel sheet volume".

As described above, welding is performed under a condition that the ratio of the volume of the initial fusion portion to the "steel sheet volume" is set to from 0.08, which corresponds to the lower limit predetermined value of the fusion amount of the steel sheet component in the sheet thickness direction obtained by addition of fusion heat of the main fusion portion, to 0.20, which corresponds to a value not exceeding the upper limit predetermined value of the fusion amount of the steel sheet component in the sheet thickness direction obtained by addition of fusion heat of the main fusion portion. Accordingly, the fused portion and the structure transformed portion present near the fused portion are not formed in the entire region of the sheet thickness, and an unfused base material portion is secured between the surface of the steel sheet and the structure transformed portion present near the fused portion. Therefore, the base material portion functions to maintain strength of the steel sheet component, and hence weld joining strength of the bolt can be ensured sufficiently. Further, a boundary area between the structure transformed portion and the base material portion can be ensured over a wide region, and hence joining strength of the boundary area portion can be kept high. Thus, even when an external force is applied to bend the bolt, a fracture or the like does not occur easily.

Before fusion, a shape of the initial fusion portion is a flat conical shape. However, at an initial stage of fusion, the conical shape disappears and transforms into a flat fused region integrated with the fused portion of the surface portion of the steel sheet component. The above-mentioned phenomenon in which fusion heat of the main fusion portion is added to the steel sheet component, or fusion heat of the main fusion portion is transferred to the steel sheet component via the initial fusion portion means that fusion heat of the main fusion portion is transferred to the above-mentioned flat fused region and then transferred to an unfused region of the steel sheet component, thereby enlarging a fusion range of the steel sheet component.

In order to obtain a proper fusion amount of the steel sheet component in the sheet thickness direction, the numerical value range of from 0.08 to 0.20 set as described above is practically important. However, selection of those values is based on a basic phenomenon involving the "fusion heat addition".

After completion of the welding, the clearance is secured between the vicinity of the outer periphery of the enlarged diameter portion and the surface of the steel sheet component. Thus, the air in the clearance is discharged so that the coating liquid can adhere to portions which define the clearance, including the lower surface of the enlarged diameter portion, the outer peripheral surface of the main fusion portion, the exposed portion of the fused portion, the surface of the steel sheet component.

When the clearance between the vicinity of the outer periphery of the enlarged diameter portion and the surface of the steel sheet component is extremely narrow, fluidity of the coating liquid in the clearance cannot be obtained due to viscosity of the coating liquid. Accordingly, the air stagnating in the clearance is not discharged so that the air is sealed due to the coating liquid. Consequently, there arises a problem in that the sealed air causes rust.

However, as in the present invention, the clearance having a size large enough to prevent air bubbles from being sealed therein due to the coating liquid is secured between the vicinity of the outer periphery of the enlarged diameter portion and the surface of the steel sheet component, thereby solving the above-mentioned problem of occurrence of rust. That is, the clearance defined between the vicinity of the outer periphery of the enlarged diameter portion and the surface of the steel sheet component can be ensured as a sufficient space owing to a height dimension of the main fusion portion in the sheet thickness direction of the steel sheet component, and hence the coating liquid flows into the clearance actively. This flow causes discharge of the air from the clearance, and the coating liquid adheres to the enlarged diameter portion, the main fusion portion, the exposed portion of the fused portion, the surface of the steel sheet component, and the like, which define the clearance. As a result, air bubbles are not sealed, and the above-mentioned problem of occurrence of rust is solved.

Secondly, operations and effects of the welding method comprising the latter "pressure use" are described with emphasis on the "pressure use".

When the ratio of the circular area (mm²) of the initial fusion portion to the sheet thickness (mm) of the steel sheet component is set to, for example, 100, a ratio of the fusion area to the sheet thickness of the steel sheet is large. The fused metal having the wide area and region is pressurized, and hence internal pressure of the liquefied metal is kept low. Accordingly, an amount of heat transferred from the fused metal to the unfused portion of the steel sheet per unit area is reduced, and a penetration amount in the sheet thickness direction of the unfused portion is small. Further, the fusion range in a surface direction of the steel sheet is large, and hence fusion heat is transferred from a long fusion outer peripheral edge to the wide region. Consequently, the amount of heat transferred in the sheet thickness direction is reduced, and progress of penetration in the sheet thickness direction is slowed down. Therefore, when the above-mentioned ratio of the circular area of the initial fusion portion to the sheet thickness of the steel sheet component is set as large as 100, progress of penetration in the sheet thickness direction is slowed down, and excessive fusion can be prevented. Thus, welding strength of the projection bolt is maintained properly.

In the following description, the "ratio of the circular area of the initial fusion portion to the sheet thickness of the steel sheet component" is sometimes abbreviated as "sheet thickness-area ratio".

When the above-mentioned "sheet thickness-area ratio" is set to, for example, 50, the ratio of the fusion area to the sheet thickness of the steel sheet is small. The fused metal having the small area and region is pressurized, and hence the internal pressure of the liquefied metal is kept high. Accordingly, the amount of heat transferred from the fused metal to the unfused portion of the steel sheet per unit area is increased, and the penetration amount in the sheet thickness direction of the unfused portion is large. Further, the fusion range in the surface direction of the steel sheet is small, and hence fusion heat is transferred from a short fusion outer peripheral edge to the small region. Consequently, the amount of heat transferred in the sheet thickness direction is increased, and progress of penetration in the sheet thickness direction is accelerated. Therefore, when the above-mentioned "sheet thickness-area ratio" is set as small as 50, progress of penetration in the sheet thickness direction is accelerated, and a large fusion depth is obtained. Thus, welding strength of the projection bolt is maintained properly.

The above-mentioned phenomena cause a state in which the fused metal is sealed between the initial fusion portion and the unfused portion of the steel sheet at the initial stage of fusion, whereas the fused metal is sealed between the main fusion portion and the unfused portion of the steel sheet at the latter stage of fusion. Accordingly, a pressure condition of the liquefied metal influences progress of fusion in the unfused portion. That is, such phenomena are important that heat is actively conducted from the high-pressure fused metal to the unfused portion, whereas heat is slowly conducted from the low-pressure fused metal to the unfused portion. The phenomena as described above occur as in the case of the above-mentioned examples based on the "sheet thickness-area ratio", and hence excessive fusion and insufficient fusion in the sheet thickness direction can be prevented. Thus, proper welding strength can be ensured.

In order to obtain a proper fusion amount of the steel sheet component in the sheet thickness direction, the numerical values such as 100 and 50 specified as the "sheet thickness-area ratio" as described above are practically important. However, the selection of those values is based on the basic phenomenon involving the "pressure use".

The same operations and effects, which are obtained by securing the clearance between the vicinity of the outer periphery of the enlarged diameter portion and the surface of the steel sheet component after completion of the welding, are attained both in the method comprising the "pressure use" and the method comprising the "fusion heat addition".

According to a second aspect of the present invention, there is provided a projection bolt welding method, wherein the adding the fusion heat of the main fusion portion to the circular initial fusion portion transformed into the flat fused region at the initial stage of the fusion is carried out through selection of a ratio of a volume of the circular initial fusion portion to a volume of a portion of the steel sheet component having the same diameter as a diameter of the circular initial fusion portion, or the progressing the fusion of the steel sheet component due to the pressure of the fused metal sealed between the main fusion portion and the unfused portion of the steel sheet component is carried out through selection of a ratio of a circular area of the circular initial fusion portion to a sheet thickness of the steel sheet component.

In a case of the "fusion heat addition", the adding the fusion heat of the main fusion portion to the initial fusion portion transformed into the flat fused region at the initial stage of the fusion is carried out through the selection of the ratio of the volume of the initial fusion portion to the volume of the portion of the steel sheet component having the same diameter as the diameter of the circular initial fusion portion.

Before the fusion, the shape of the initial fusion portion is the flat conical shape. However, at the initial stage of the fusion, the conical shape disappears and transforms into the flat fused region integrated with the fused portion of the surface portion of the steel sheet component. Due to the above-mentioned phenomenon in which the fusion heat of the main fusion portion is added to the steel sheet component, or the fusion heat of the main fusion portion is transferred to the steel sheet component via the initial fusion portion, the fusion heat of the main fusion portion is transferred to the above-mentioned flat fused region and then transferred to the unfused region of the steel sheet component, thereby enlarging the fusion range of the steel sheet component. As described above, the relationship of the volume of the initial fusion portion to the volume of the portion of the steel sheet component having the same diameter as the diameter of the circular initial fusion portion is essential.

In a case of the "pressure use", the above-mentioned phenomena cause the state in which the fused metal is sealed between the initial fusion portion and the unfused portion of the steel sheet at the initial stage of fusion, whereas the fused metal is sealed between the main fusion portion and the unfused portion of the steel sheet at the latter stage of fusion. Accordingly, the pressure condition of the liquefied metal influences the progress of fusion in the unfused portion. That is, such phenomena are important that heat is actively conducted from the high-pressure fused metal to the unfused portion, whereas heat is slowly conducted from the low-pressure fused metal to the unfused portion. The phenomena as described above occur as in the case of the above-mentioned examples based on the "sheet thickness-area ratio", and hence the excessive fusion and the extremely insufficient fusion in the sheet thickness direction can be prevented. Thus, proper welding strength can be ensured. As described above, the relationship of the circular area of the initial fusion portion to the sheet thickness of the steel sheet component is essential.

According to a third aspect of the present invention, there is provided a projection bolt welding method, wherein the ratio of the volume of the circular initial fusion portion to the volume of the portion of the steel sheet component having the same diameter as the diameter of the circular initial fusion portion is set to from 0.08 to 0.20, or the ratio of the circular area (mm$^2$) of the circular initial fusion portion to the sheet thickness (mm) of the steel sheet component is set to from 45 to 105.

In the case of the "fusion heat addition", as described above, when the ratio of the volume of the initial fusion portion to the "steel sheet volume" is set to 0.08, the fusion amount of the steel sheet component in the sheet thickness direction obtained by addition of the fusion heat of the main fusion portion exhibits the lower limit predetermined value. Further, when the above-mentioned ratio is set to 0.20, the fusion amount of the steel sheet component in the sheet thickness direction obtained by addition of the fusion heat of the main fusion portion exhibits the upper limit predetermined value. Therefore, the fused portion and the structure transformed portion present near the fused portion are not formed in the entire region of the sheet thickness, and the unfused base material portion is secured between the structure transformed portion present near the fused portion and the surface of the steel sheet. Therefore, the base material portion functions to maintain the strength of the steel sheet component, and hence the weld bonding strength of the bolt can be ensured sufficiently. Further, the boundary area between the structure transformed portion and the base material portion can be ensured over a wide region, and hence the joining strength of the boundary area portion can be kept high. Thus, even when an external force is applied to bend the bolt, a fracture or the like does not occur easily.

In the case of the "pressure use", when the above-mentioned "sheet thickness-area ratio" is set as small as 45, the progress of penetration in the sheet thickness direction is accelerated, and a large fusion depth is obtained. Thus, the welding strength of the projection bolt is maintained properly. When the above-mentioned "sheet thickness-area ratio" is set as large as 105, the progress of penetration in the sheet thickness direction is slowed down, and the excessive fusion can be prevented. Thus, the welding strength of the projection bolt is maintained properly.

As described above, based on an overall consideration of the "fusion heat addition" and the "pressure use" according to the first to third aspects of the present invention, the "fusion heat addition" and the "pressure use" are common in being capable of preventing the excessive fusion and the extremely insufficient fusion of the steel sheet component in the sheet thickness direction and ensuring proper welding strength. Accordingly, the "fusion heat addition" and the "pressure use" can be combined so as to be utilized as concurrent phenomena.

BRIEF DESCRIPTION OF DRAWINGS

FIG. 1A is a side view of a projection bolt.
FIG. 1B is an enlarged view of a head part of the projection bolt of FIG. 1A.
FIG. 2 is a sectional view for illustrating a state in which the projection bolt and a steel sheet component are sandwiched between a stationary electrode and a movable electrode.

FIG. 10A is a side view of a related-art projection bolt.
FIG. 10B is a sectional view for illustrating a fusion-bonded state of the related-art bolt.

DESCRIPTION OF EMBODIMENTS

Figure 3A:
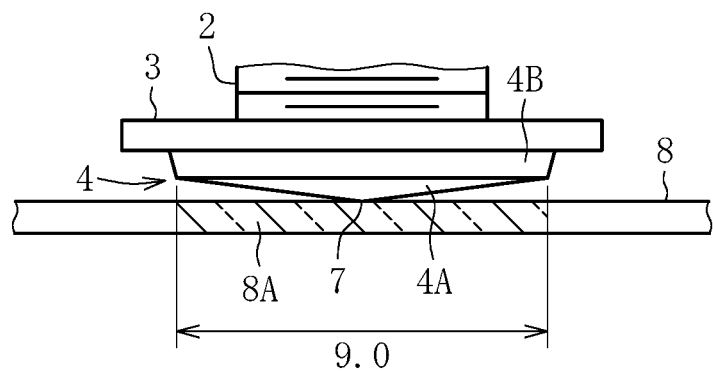
FIG. 3A is a side view for illustrating a relationship between the steel sheet component and an initial fusion portion.
Figure 3B:
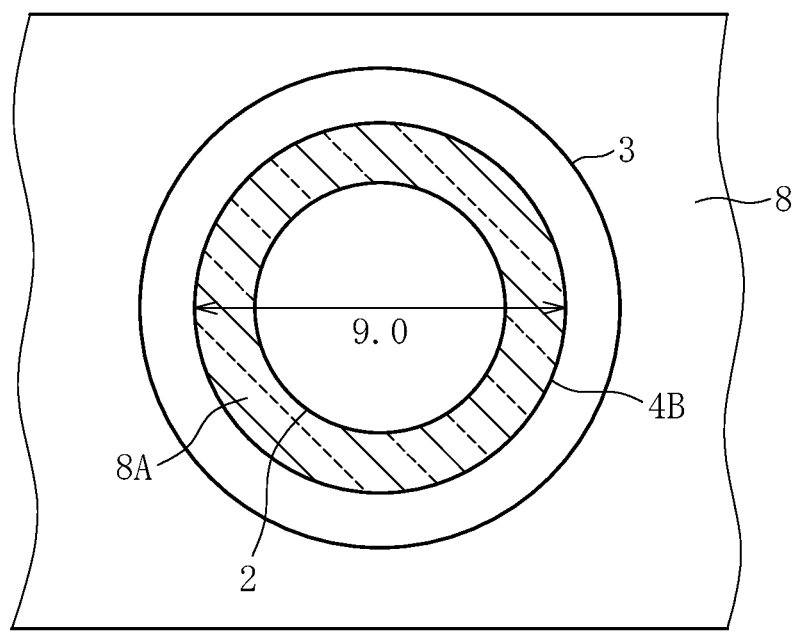
FIG. 3B is a plan view of FIG. 3A.

Next, description is made of a projection bolt welding method according to embodiments of the present invention.

First Embodiment

FIG. 1A to FIG. 6 are illustrations of a first embodiment of the present invention based on "fusion heat addition".

First, dimensions and a shape of a projection bolt are described.

A shape of an iron projection bolt 1 is illustrated in FIG. 1A. The bolt 1 comprises a shank 2 having an external thread formed therein, a circular enlarged diameter portion 3 formed integrally with the shank 2 and having a diameter larger than a diameter of the shank 2, and a circular welding projection 4 arranged at a center of the enlarged diameter portion on a side opposite to the shank 2. Reference numeral 5 denotes the external thread formed in an outer peripheral surface of the shank 2, and the external thread comprises roots and crests.

As illustrated in FIG. 1A, FIG. 3A, etc., the welding projection 4 comprises an initial fusion portion 4A and a main fusion portion 4B. The initial fusion portion 4A is a flat conical portion shaped by forming, on an end surface of the welding projection 4, a tapered portion 6 reduced in height as approaching to an outer peripheral side thereof at a small taper inclination angle. A pointed vertex 7 is formed at a center portion of the initial fusion portion 4A. The main fusion portion 4B is a truncated cone portion formed continuously with the initial fusion portion 4A. The bolt 1 is subjected to die molding, rolling, and the like. Accordingly, when observed in an enlarged manner, actually, the shape of the above-mentioned vertex 7 is not sharply pointed but is slightly rounded.

For easy understanding of a dimensional condition of this embodiment, dimensions of components and an inclination angle are illustrated in FIG. 1B. As illustrated in FIG. 1B, the diameter (crest diameter) of the shank 2 is 5.5 mm, a length of the shank 2 is 24.5 mm, and the diameter and a thickness of the enlarged diameter portion 3 are 13.2 mm and 1.0 mm, respectively. Further, a diameter of the end surface of the welding projection 4 (tapered portion 6) is 9.0 mm, and a height (thickness) of the initial fusion portion 4A is 0.32 mm. A height (thickness) of the main fusion portion 4B is 0.9 mm, and an inclination angle θ of the tapered portion 6 is 4.5 degrees.

Next, a welding state of the bolt 1 is described.

FIG. 2 is a sectional view for illustrating a state in which the bolt 1 is welded to a steel sheet component 8. A movable electrode 9 is moved forward and backward by an air cylinder, an electric motor of a forward-backward movement output type, or the like (not shown). A reception hole 10 is formed in a center portion of an end surface of the movable electrode 9 to extend in a longitudinal direction of the movable electrode 9, and a permanent magnet 11 is fixed on an inner portion of the reception hole 10. The steel sheet component 8 is placed on a stationary electrode 12 arranged coaxially with the movable electrode 9.

The shank 2 is inserted into the reception hole 10 of the movable electrode 9 by an operator or a feeding rod, and the shank 2 is attracted by the permanent magnet 11 so that the bolt 1 is held in the movable electrode 9. At this time, an end surface 13 of the movable electrode 9 is held in close contact with a back surface of the enlarged diameter portion 3. FIG. 2 is an illustration of a state in which the movable electrode 9 holding the bolt 1 therein is moved forward and the welding projection 4 is pressurized against the steel sheet component 8. Although not shown, due to the pressurization, the vertex 7 and the tapered portion 6 formed near the vertex 7 sink into a surface of the steel sheet component 8. That is, a tip of the tapered portion 6 of the initial fusion portion 4A slightly bites into the surface of the steel sheet component 8, thereby increasing a contact area between the welding projection 4 and the steel sheet component 8. A welding current is caused to flow in this state, and the bolt is welded to the steel sheet component 8.

Next, a relationship between the initial fusion portion and the steel sheet component is described.

A relationship of a volume of a partially shaped portion of the projection bolt 1 to a volume of a predetermined portion of the steel sheet component 8 closely relates to a fusion state of the steel sheet component 8. That is, the above-mentioned relationship refers to a relationship between a volume of a portion of the steel sheet component 8 having the same diameter as that of the circular initial fusion portion 4A and a volume of the initial fusion portion 4A. The steel sheet component 8 having the same diameter as that of the circular initial fusion portion 4A corresponds to a circular sheet portion 8A, and a volume of the circular sheet portion 8A corresponds to the above-mentioned "steel sheet volume". In this case, the steel sheet component 8 has a sheet thickness of 0.65 mm.

The diameter of the circular sheet portion 8A is 9.0 mm as described above, and hence the volume of the circular sheet portion 8A, namely, the "steel sheet volume" is 41.33 mm$^3$. Further, the initial fusion portion 4A has the height of 0.32 mm and the diameter of 9.0 mm as described above, and hence the initial fusion portion 4A has a volume of 6.79 mm$^3$. Therefore, a ratio of the volume of the initial fusion portion 4A to the volume of the circular sheet portion 8A, namely, to the "steel sheet volume" is 0.16.

Next, pressurization and energization conditions are described.

A pressurization force exerted by the movable electrode 9, namely, a force of pressurizing the welding projection 4 onto the steel sheet component 8 is 2,300 N, a welding current is 14,000 A, and an energization time period is eight cycles. The energization time period of eight cycles corresponds to a time period from start of energization to finish of fusion of the main fusion portion 4B subsequent to start of fusion of the initial fusion portion 4A after an elapse of a predetermined time period since the start of the energization. Note that, one cycle is 1/60 second.

Satisfactory welding can be attained under the above-mentioned conditions, and satisfactory setting ranges of the respective conditions are as follows. The pressurization force is from 2,000 N to 3,000 N, the welding current is from 10,000 A to 15,000 A, and the energization time period is from five to ten cycles.

Next, a fusion bonding process in a case of the volume ratio of 0.16 is described.

Figure 4A:
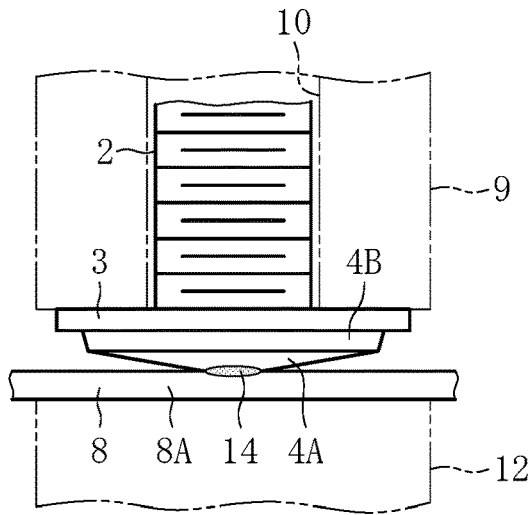
FIG. 4A is a sectional view for illustrating a fusion bonding process in an initial stage of welding.
Figure 4B:
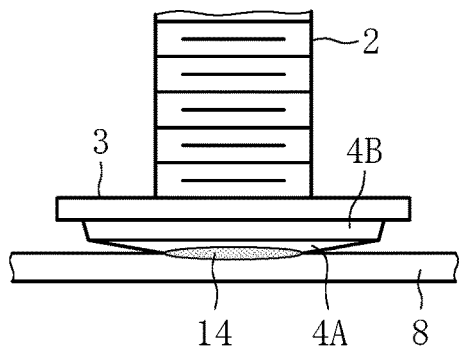
FIG. 4B is a sectional view for illustrating the fusion bonding process in the midst of welding.
Figure 4C:
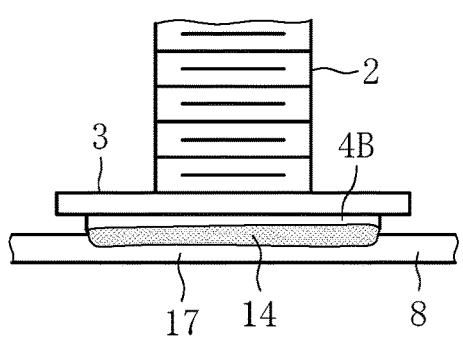
FIG. 4C is a sectional view for illustrating the fusion bonding process at the time of finish of welding.

FIG. 4A to FIG. 4D are illustrations of the fusion bonding process. FIG. 4A to FIG. 4C are sectional views, but hatching of a sectional portion is omitted for the clarity of the illustrations. FIG. 4A is an illustration of an initial stage of energization at which the welding current is caused to flow in the pressing state illustrated in FIG. 2, and an illustration of a state in which the vicinity of the vertex 7 and the steel sheet component 8 corresponding thereto (circular sheet portion 8A) are slightly fused. The fused portion is denoted by reference numeral 14.

When pressurization and energization are further continued, along the inclination angle of the tapered portion 6, the fused portion 14 is enlarged into a circular fusion range extending in a diameter direction in a radial and substantially planar manner. A transient state of the enlargement is illustrated in FIG. 4B.

Then, when pressurization and energization are still further continued, subsequently to fusion of the entire initial fusion portion 4A, fusion of the main fusion portion 4B is started simultaneously. As illustrated in FIG. 4C, the fusion of the initial fusion portion 4A causes fusion of an entire surface of the steel sheet component 8 corresponding to the circular range of the initial fusion portion 4A, namely, fusion of a portion close to the surface of the circular sheet portion 8A. At a point in time when the above-mentioned energization time period of eight cycles elapses, a fusion state illustrated in FIG. 4C is attained.

Figure 4D:
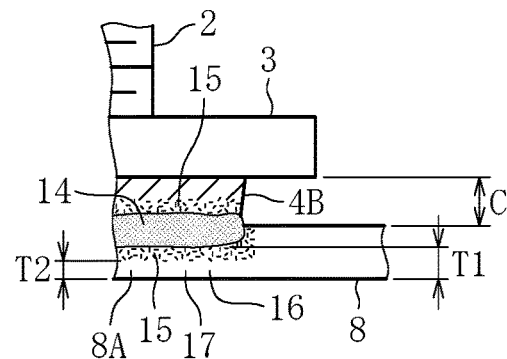
FIG. 4D is a partially enlarged view of FIG. 4C.

As is apparent from FIG. 4C and FIG. 4D, not an entire range of the main fusion portion 4B in a thickness direction, but one-third to a half of the range of the main fusion portion 4B in the thickness direction is fused. The above-mentioned welding conditions, such as the pressurization force, the current value, and the energization time period, are set so that the main fusion portion 4B is fused within this range. As described later, heat of the above-mentioned fusion of the main fusion portion 4B is added to fusion heat of the initial fusion portion 4A and applied to the steel sheet component 8, thereby properly ensuring a fusion range state of the steel sheet component 8.

Before fusion, the shape of the initial fusion portion 4A is a flat conical shape as illustrated in the drawings. However, at the initial stage of fusion, the conical shape disappears and transforms into a flat fused region integrated with the fused portion of the surface portion of the steel sheet component 8. The above-mentioned phenomenon in which fusion heat of the main fusion portion 4B is added to the steel sheet component 8, or fusion heat of the main fusion portion 4B is transferred to the steel sheet component 8 via the initial fusion portion 4A means that fusion heat of the main fusion portion 4B is transferred to the above-mentioned flat fused region and then transferred to an unfused region (solid phase) of the steel sheet component 8, thereby enlarging a fusion range of the steel sheet component 8.

FIG. 4D is a partially enlarged sectional view for illustrating a structural state after completion of fusion bonding. In FIG. 4D, a shaded portion corresponds to the fused portion 14, and corresponds to the above-mentioned nugget. A layered portion appearing near the fused portion 14 corresponds to a structure transformed portion 15, and corresponds to the above-mentioned heat affected zone (HAZ). The structure transformed portion 15 is indicated by the dotted pattern in FIG. 4D.

Reference numeral 16 denotes an unfused portion of the circular sheet portion 8A. The unfused portion is formed of the structure transformed portion 15 and a base material 17 of the steel sheet that is not subjected to a thermal effect, and a thickness of the unfused portion is denoted by T1. Further, a thickness of the base material 17 alone is denoted by T2.

The above-mentioned fusion process proceeds as a composite fusion phenomenon of the initial fusion portion 4A and the main fusion portion 4B. This point is observed in detail. The fusion of the surface of the steel sheet component 8 is started simultaneously with the fusion of the voluminal portion of the initial fusion portion 4A. At the same time, the fusion of the main fusion portion 4B is also progressed. At this time, when the volume of the initial fusion portion 4A is large, an amount of fusion heat of the initial fusion portion 4A itself is large. Accordingly, in proportion to the amount of fusion heat, the fusion amount on the steel sheet component 8 side is also increased. In addition to the increase of the fusion amount on the steel sheet component 8 side, a larger amount of the fusion heat of the main fusion portion 4B is applied to the steel sheet component 8 via the initial fusion portion 4A having the large volume. As described above, when the fusion heat of the initial fusion portion 4A having the large volume and the fusion heat of the main fusion portion 4B are synergistically applied to the steel sheet component 8, the steel sheet component 8 is fused in the entire region of the sheet thickness thereof. That is, it is essential to avoid setting the volume of the initial fusion portion 4A to an extremely large volume with respect to that of the steel sheet component 8.

On the other hand, as described above, the fusion of the surface of the steel sheet component 8 is started simultaneously with the fusion of the voluminal portion of the initial fusion portion 4A. At the same time, the fusion of the main fusion portion 4B is also progressed. At this time, when the volume of the initial fusion portion 4A is small, the amount of fusion heat of the initial fusion portion 4A itself is small. Accordingly, in proportion to the amount of fusion heat, the fusion amount on the steel sheet component 8 side is also decreased. In addition to the decrease of the fusion amount on the steel sheet component 8 side, a smaller amount of the fusion heat of the main fusion portion 4B is applied to the steel sheet component 8 via the initial fusion portion 4A having the small volume. As described above, when the fusion heat of the initial fusion portion 4A having the small volume and the fusion heat of the main fusion portion 4B are synergistically applied to the steel sheet component 8, the amount of heat applied to the steel sheet component 8 is excessively small, and the steel sheet component 8 is only slightly fused in the sheet thickness direction. That is, it is essential to avoid setting the volume of the initial fusion portion 4A to an extremely small volume with respect to that of the steel sheet component 8.

The fusion amount of the steel sheet component 8 depends on the above-mentioned heat flow process, and hence the volume ratio of the initial fusion portion 4A to the circular sheet portion 8A serves as an important factor. The volume ratio is set to 0.16 as in this embodiment. Thus, the amount of fusion heat of the initial fusion portion 4A itself and the amount of heat supplied from the main fusion portion 4B are properly converged, with the result that the fusion amount on the steel sheet component 8 side is set as illustrated in FIG. 4D. That is, it is possible to ensure that the unfused portion 16 and the base material 17 are appropriately secured.

The above-mentioned phenomenon is described inclusively. The above-mentioned volume of the initial fusion portion 4A is extremely large or small with respect to the volume of the steel sheet component 8. Accordingly, the volume of the initial fusion portion 4A is set within a predetermined range in consideration of a correlation with the volume on the steel sheet component 8 side, and an insufficient amount of heat for proper fusion of the steel sheet component is complementarily supplied from the main fusion portion 4B. In other words, the volume of the initial fusion portion 4A is set in consideration of a correlation with the "steel sheet volume" within a range causing no actual harm to initial fusion of the steel sheet component 8, and the insufficient amount of heat for proper fusion of the steel sheet component 8 is complemented by the main fusion portion 4B.

Fusion heat of the above-mentioned main fusion portion 4B is complementarily applied to the steel sheet component 8 via the initial fusion portion 4A, and hence it is necessary to adjust the fusion amount of the main fusion portion 4B. That is, when an excessive amount of heat is added from the main fusion portion 4B, the steel sheet component 8 is fused excessively. Further, when an extremely small amount of heat is added from the main fusion portion 4B, the steel sheet component 8 is fused to an extremely small degree.

In this case, the volume of the main fusion portion 4B having the dimensions illustrated in FIG. 1B is about 58.54 mm$^3$, and one-third to a half of the volume of about 58.54 mm$^3$ of the main fusion portion 4B is fused subsequently to the fusion of the initial fusion portion 4A. The one-third to the half of the volume of the main fusion portion 4B is fused in the sheet thickness direction of the steel sheet component 8. The reason why "about" is added as in the description of about 58.54 mm$^3$ is because the outer peripheral surface of the main fusion portion 4B is the tapered surface.

The bolt having the above-mentioned volume ratio of 0.16 was welded under the above-mentioned welding conditions, specifically, the pressurization force of 2,300 N, the welding current of 14,000 A, and the energization time period of eight cycles. As a result, the thickness T1 of the unfused portion 16 was 0.4 mm, and the thickness T2 of the base material 17 was 0.3 mm.

Next, specific values of the thicknesses T1 and T2 are described.

Figure 5:
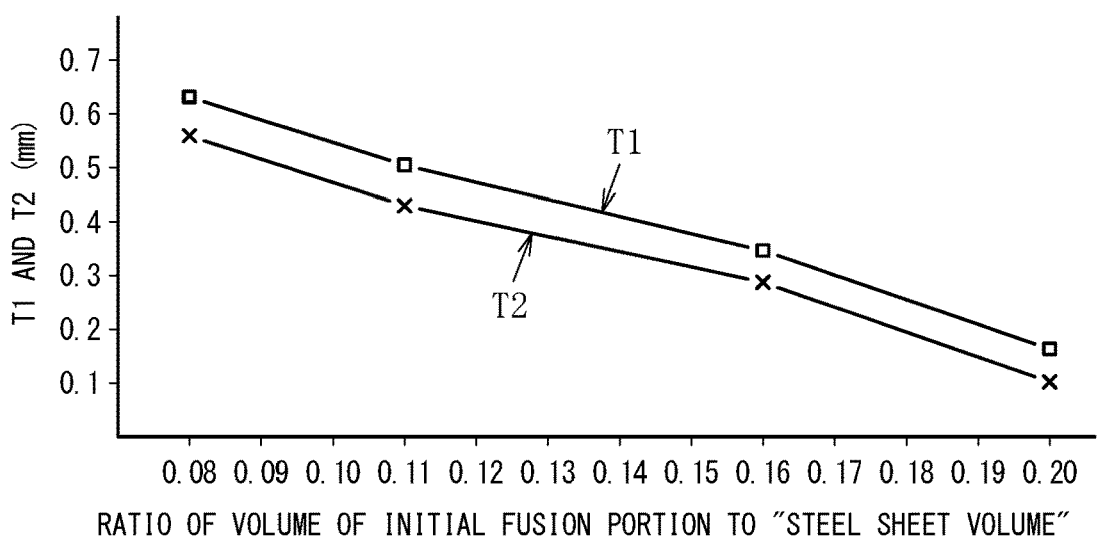
FIG. 5 is a graph for showing a relationship between a volume ratio and thicknesses T1 and T2.

FIG. 5 is a graph for showing a relationship between the thickness T1 or T2 and the ratio of the volume of the initial fusion portion to the "steel sheet volume". When the volume ratio is 0.16, as described above, the thickness T1 is 0.4 mm, and the thickness T2 is 0.3 mm. When those values are shown, a penetration amount of the steel sheet component 8 in the thickness direction and the thickness of the base material 17 are proper.

Simultaneously with ensuring of the above-mentioned values of the thicknesses T1 and T2, after completion of the welding, a clearance C having a size large enough to prevent air bubbles from being sealed therein due to a coating liquid is secured between a vicinity of an outer periphery of the enlarged diameter portion 3 and the surface of the steel sheet component 8. The size of the clearance C is 0.5 mm. Further, the welding conditions such as the pressurization force, the current value, and the energization time period are changed, thereby being capable of adjusting the size of the clearance C to 0.4 mm, 0.6 mm, or the like.

Figure 6:
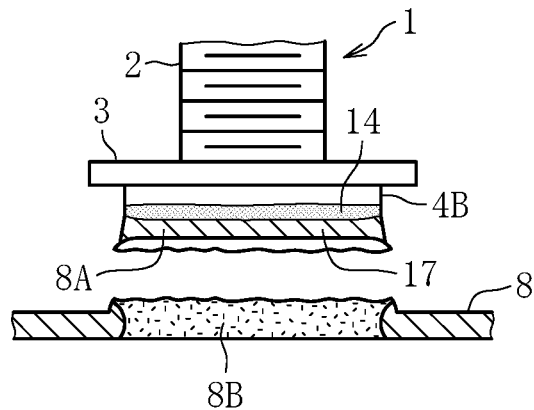
FIG. 6 is a sectional view for illustrating a state after a tensile test is conducted.

As illustrated in FIG. 6, there was conducted a test of pulling the bolt 1 in an axial direction under a state in which the steel sheet component 8 was fixed by a jig (not shown). As a result, the base material 17 and the fused portion 14 were sheared off the steel sheet component 8 so that the bolt broke, and it was recognized that a cut-out hole 8B corresponding to the circular sheet portion 8A was formed. This breakage occurs when the pulling force is in a range of from 3,000 N to 3,500 N.

Further, there was conducted a bending test of inclining the shank 2 repeatedly. As a result, a fracture did not occur at a boundary portion between the fused portion 14 and the structure transformed portion 15, at the structure transformed portion 15 itself, or at a boundary portion between the structure transformed portion 15 and the base material. Based on those results, it is determined that sufficient welding strength is obtained when the bolt 1 having this size is welded to the steel sheet component 8 having an extremely small thickness of 0.65 mm.

As is apparent from FIG. 5, when only the volume ratio was changed to 0.11, the thickness T1 was 0.53 mm, and the thickness T2 was 0.43 mm. In this case, satisfactory welding strength was obtained similarly to the case of the volume ratio of 0.16. Values of the thickness T1 or values of the thickness T2 obtained by sequentially changing the volume ratio in this manner are connected in line, thereby drawing correlation lines for the thicknesses T1 and T2 of FIG. 5.

The welding conditions such as the pressurization force, the current value, and the energization time period are changed within the above-mentioned range under the condition that the volume ratio is 0.16. Thus, for example, the thickness T1=0.4 mm is adjustable to the thickness T1=0.28 mm, and the thickness T2=0.3 mm is adjustable to the thickness T2=0.18 mm.

Next, a lower limit predetermined value and an upper limit predetermined value of the volume ratio are described.

As described above, the values of the thicknesses T1 and T2 can be set to various values through change of the volume ratio. However, when the volume ratio is smaller than 0.08, the thickness T1 is extremely large, that is, the penetration amount of the fused portion 14 in the sheet thickness direction may be insufficient, or only the center portion of the initial fusion portion 4A may be fused so that the initial fusion portion is not entirely fused. Therefore, predetermined welding strength cannot be ensured. That is, the volume ratio of 0.08 corresponds to the lower limit predetermined value. Further, when the volume ratio exceeds 0.20, the thickness T1 is extremely small, and hence the thickness of the base material 17 is extremely small or the thickness T1 is substantially zero. As a result, predetermined welding strength cannot be ensured. That is, the volume ratio of 0.20 corresponds to the upper limit predetermined value.

The thickness T1 of 0.62 mm and the thickness T2 of 0.56=correspond to the above-mentioned lower limit predetermined value of 0.08. The thickness T1 of 0.18 mm and the thickness T2 of 0.11=correspond to the above-mentioned upper limit predetermined value of 0.20.

Next, a case of changing the sheet thickness of the steel sheet component is described.

In the above-mentioned embodiment, the sheet thickness is 0.65 mm. However, as a result of various experiments, it was confirmed that the thickness T1 and the thickness T2 were able to be properly ensured in a thin sheet having a thickness of from 0.6 mm to 1 mm through change of the welding conditions within a volume ratio range of from 0.08 to 0.20.

Note that, the initial fusion portion 4A has the volume of 6.79 mm$^3$, whereas the main fusion portion 4B has the volume of about 58.54 mm$^3$. From such a viewpoint that the fusion heat of the main fusion portion 4B is complementarily supplied to the steel sheet component 8 via the initial fusion portion 4A, it is preferred that the volume of the initial fusion portion 4A be set within a range of from 10% to 20% of the volume of the main fusion portion 4B. When the volume of the initial fusion portion 4A is 10% of the volume of the main fusion portion 4B, the fusion heat can be sufficiently supplied, and strength and rigidity of a root portion of the shank 2 can be sufficiently maintained. On the other hand, when the volume of the initial fusion portion 4A exceeds 20% of the volume of the main fusion portion 4B, there are fears in that the fusion heat is supplied excessively, and in that a material of the root portion of the shank 2 is extremely large, which is disadvantageous in cost.

In the first embodiment, the shape of the initial fusion portion 4A is a conical shape including the tapered portion 6 and the vertex 7, but a spherical shape may be employed instead of the conical shape. In a case of the spherical shape, a portion corresponding to the vertex 7 is pressurized against the steel sheet component 8, and fusion is started from the pressurized portion. The other fusion bonding process is performed similarly to the case of the conical shape.

Operations and effects of the first embodiment obtained based on the "fusion heat addition" described above are as follows.

In the first embodiment, importance is placed on such a point that the volume of the initial fusion portion 4A is matched to a volume of which portion of the steel sheet component 8. In the first embodiment, the volume of the portion the steel sheet component 8 having the same diameter as that of the circular initial fusion portion 4A is matched to the volume of the initial fusion portion 4A. The volume of the portion the steel sheet component 8 having the same diameter as that of the circular initial fusion portion 4A is most directly and thermally affected at the time of start of fusion of the initial fusion portion 4A. The steel sheet component 8 is matched to the initial fusion portion 4A and marked off into a circular portion in this manner. Thus, a thermal effect from the initial fusion portion 4A side can be quantitatively specified. In other words, the volume of the initial fusion portion 4A itself, which is matched to the volume of the portion of the steel sheet component 8 having the same diameter as that of the circular initial fusion portion 4A, directly affects a fused region of the steel sheet component 8, and a satisfactory fusion state of the steel sheet component 8 is ensured.

Before the fusion, the shape of the initial fusion portion 4A is the flat conical shape. However, at the initial stage of the fusion, the conical shape disappears and transforms into the flat fused region integrated with the fused portion of the surface portion of the steel sheet component 8 (see FIG. 4C). Due to the above-mentioned phenomenon in which the fusion heat of the main fusion portion 4B is added to the steel sheet component 8, namely, the phenomenon in which the fusion heat of the main fusion portion 4B is transferred to the steel sheet component 8 via the initial fusion portion 4A, the fusion heat of the main fusion portion 4B is transferred to the above-mentioned flat fused region and then transferred to the unfused region of the steel sheet component 8, thereby properly enlarging the fusion range of the steel sheet component 8.

As described above, welding is performed under a condition that the ratio of the volume of the initial fusion portion 4A to the "steel sheet volume" is set to from 0.08, which corresponds to the lower limit predetermined value of the fusion amount of the steel sheet component 8 in the sheet thickness direction obtained by addition of fusion heat of the main fusion portion 4B, to 0.20, which corresponds to a value not exceeding the upper limit predetermined value of the fusion amount of the steel sheet component 8 in the sheet thickness direction obtained by addition of fusion heat of the main fusion portion 4B. Accordingly, the fused portion 14 and the structure transformed portion 15 present near the fused portion 14 are not formed in the entire region of the sheet thickness, and the unfused base material portion 17 is secured between the surface of the steel sheet and the structure transformed portion 15 present near the fused portion 14. Therefore, the base material portion 17 functions to maintain strength of the steel sheet component 8, and hence weld joining strength of the bolt 1 can be ensured sufficiently. Further, a boundary area between the structure transformed portion 15 and the base material portion 17 can be ensured over a wide region, and hence joining strength of the boundary area portion can be kept high. Thus, even when an external force is applied to bend the bolt 1, a fracture or the like does not occur easily.

In addition to setting the volume ratio of the initial fusion portion 4A to the "steel sheet volume" to from 0.08 to 0.20, the volume ratio of the initial fusion portion 4A to the main fusion portion 4B is specified, thereby being capable of attaining a satisfactory result. That is, the volume of the initial fusion portion 4A is set to the range of from 10% to 20% of the volume of the main fusion portion 4B. When the volume of the initial fusion portion 4A is 10% of the volume of the main fusion portion 4B, the fusion heat can be sufficiently supplied from the main fusion portion 4B to the steel sheet component 8, and strength and rigidity of the root portion of the shank 2 can be sufficiently maintained. On the other hand, when the volume of the initial fusion portion 4A exceeds 20% of the volume of the main fusion portion 4B, there are fears in that the fusion heat is supplied excessively from the main fusion portion 4B to the steel sheet component 8, and in that the material of the root portion of the shank 2 is extremely large, which is disadvantageous in cost. Therefore, the volume of the initial fusion portion 4A is set to 20% or less of the volume of the main fusion portion 4B, thereby being capable of avoiding those fears.

After completion of welding, the clearance is secured between the vicinity of the outer periphery of the enlarged diameter portion and the surface of the steel sheet component. Thus, the air in the clearance is discharged so that the coating liquid can adhere to a lower surface of the enlarged diameter portion, an outer peripheral surface of the main fusion portion, an exposed portion of the fused portion, the surface of the steel sheet component, and the like, which define the clearance.

When the clearance C between the vicinity of the outer periphery of the enlarged diameter portion 3 and the surface of the steel sheet component is extremely narrow, fluidity of the coating liquid in the clearance C cannot be obtained due to viscosity of the coating liquid. Accordingly, the air stagnating in the clearance C is not discharged so that the air is sealed due to the coating liquid. Consequently, there arises a problem in that the sealed air causes rust.

However, as in this embodiment, the clearance C having a size large enough to prevent air bubbles from being sealed therein due to the coating liquid is secured between the vicinity of the outer periphery of the enlarged diameter portion 3 and the surface of the steel sheet component, thereby solving the above-mentioned problem of occurrence of rust. That is, the clearance C defined between the vicinity of the outer periphery of the enlarged diameter portion 3 and the surface of the steel sheet component can be ensured as a sufficient space C owing to a height dimension of 0.9 mm of the main fusion portion 4B in the sheet thickness direction of the steel sheet component 8, and hence the coating liquid flows into the clearance C actively. This flow causes discharge of the air from the clearance C, and the coating liquid adheres to the lower surface of the enlarged diameter portion 3, the outer peripheral surface of the main fusion portion 4B, the exposed portion of the fused portion 14, the surface of the steel sheet component 8, and the like (see FIG. 4D), which define the clearance C. As a result, air bubbles are not sealed, and the above-mentioned problem of occurrence of rust is solved.

Second Embodiment

FIG. 1A, FIG. 1B, FIG. 2, and FIG. 6 to FIG. 9 are illustrations of a second embodiment of the present invention based on "pressure use". FIG. 1A, FIG. 1B, FIG. 2, and FIG. 6 are common between the second embodiment and the first embodiment. Further, in order to facilitate reading through the description, the same illustrations of FIG. 4A to FIG. 4D are applied to FIG. 7A to FIG. 7D.

First, dimensions and a shape of a projection bolt are described.

A shape of an iron projection bolt 1 is illustrated in FIG. 1A. The bolt 1 comprises a shank 2 having an external thread formed therein, a circular enlarged diameter portion 3 formed integrally with the shank 2 and having a diameter larger than a diameter of the shank 2, and a circular welding projection 4 arranged at a center of the enlarged diameter portion on a side opposite to the shank 2. Reference numeral 5 denotes the external thread formed in an outer peripheral surface of the shank 2, and the external thread comprises roots and crests.

Figure 7A:
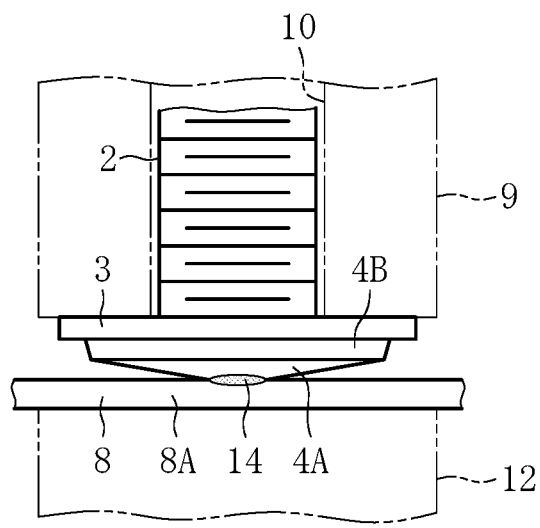
FIG. 7A is a sectional view for illustrating a fusion bonding process in an initial stage of welding.

As illustrated in FIG. 1A, FIG. 7A, etc., the welding projection 4 comprises an initial fusion portion 4A and a main fusion portion 4B. The initial fusion portion 4A is a flat conical portion shaped by forming, on an end surface of the welding projection 4, a tapered portion 6 reduced in height as approaching to an outer peripheral side thereof at a small taper inclination angle. A pointed vertex 7 is formed at a center portion of the initial fusion portion 4A. The main fusion portion 4B is a truncated cone portion formed continuously with the initial fusion portion 4A. The bolt 1 is subjected to die molding, rolling, and the like. Accordingly, when observed in an enlarged manner, actually, the shape of the above-mentioned vertex 7 is not sharply pointed but is slightly rounded.

For easy understanding of a dimensional condition of this embodiment, dimensions of components and an inclination angle are illustrated in FIG. 1B. As illustrated in FIG. 1B, the diameter (crest diameter) of the shank 2 is 5.5 mm, a length of the shank 2 is 24.5 mm, and the diameter and a thickness of the enlarged diameter portion 3 are 13.2 mm and 1.0 mm, respectively. Further, a diameter of the end surface of the welding projection 4 (tapered portion 6) is 9.0 mm, and a height (thickness) of the initial fusion portion 4A is 0.32 mm. A height (thickness) of the main fusion portion 4B is 0.9 mm, and an inclination angle θ of the tapered portion 6 is 4.5 degrees.

Next, a welding state of the bolt 1 is described.

FIG. 2 is a sectional view for illustrating a state in which the bolt 1 is welded to a steel sheet component 8. A movable electrode 9 is moved forward and backward by an air cylinder, an electric motor of a forward-backward movement output type, or the like (not shown). A reception hole 10 is formed in a center portion of an end surface of the movable electrode 9 to extend in a longitudinal direction of the movable electrode 9, and a permanent magnet 11 is fixed on an inner portion of the reception hole 10. The steel sheet component 8 is placed on a stationary electrode 12 arranged coaxially with the movable electrode 9.

The shank 2 is inserted into the reception hole 10 of the movable electrode 9 by an operator or a feeding rod, and the shank 2 is attracted by the permanent magnet 11 so that the bolt 1 is held in the movable electrode 9. At this time, an end surface 13 of the movable electrode 9 is held in close contact with a back surface of the enlarged diameter portion 3. FIG. 2 is an illustration of a state in which the movable electrode 9 holding the bolt 1 therein is moved forward and the welding projection 4 is pressurized against the steel sheet component 8. Although not shown, due to the pressurization, the vertex 7 and the tapered portion 6 formed near the vertex 7 sink into a surface of the steel sheet component 8. That is, a tip of the tapered portion 6 of the initial fusion portion 4A slightly bites into the surface of the steel sheet component 8, thereby increasing a contact area between the welding projection 4 and the steel sheet component 8. A welding current is caused to flow in this state, and the bolt is welded to the steel sheet component 8. Note that, a sheet thickness of the steel sheet component 8 falls within a range of from 0.6 mm to 1 mm.

Next, pressurization and energization conditions are described.

A pressurization force exerted by the movable electrode 9, namely, a force of pressurization the welding projection 4 onto the steel sheet component 8 is 2,300 N, a welding current is 14,000 A, and an energization time period is eight cycles. The energization time period of eight cycles corresponds to a time period from start of energization to finish of fusion of the main fusion portion 4B subsequent to start of fusion of the initial fusion portion 4A after an elapse of a predetermined time period since the start of the energization. Note that, one cycle is 1/60 second.

Satisfactory welding can be attained under the above-mentioned conditions, and satisfactory setting ranges of the respective conditions are as follows. The pressurization force is from 2,000 N to 3,000 N, the welding current is from 10,000 A to 15,000 A, and the energization time period is from five to ten cycles.

Next, a fusion bonding process is described.

Figure 7B:
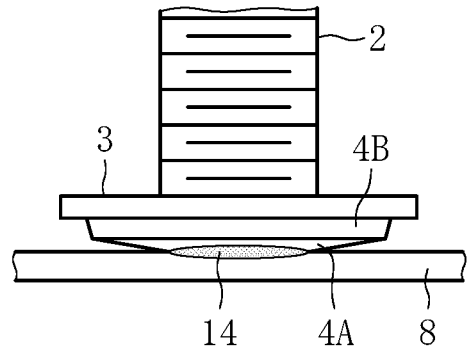
FIG. 7B is a sectional view for illustrating the fusion bonding process in the midst of welding.
Figure 7C:
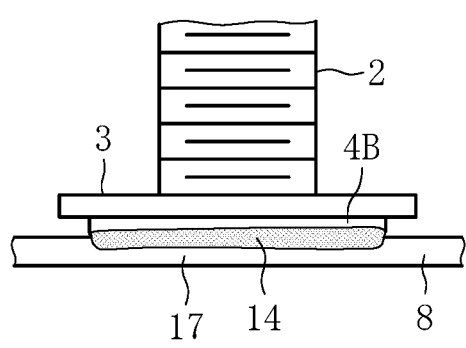
FIG. 7C is a sectional view for illustrating the fusion bonding process at the time of finish of welding.

FIG. 7A to FIG. 7D are illustrations of the fusion bonding process. FIG. 7A to FIG. 7C are sectional views, but hatching of a sectional portion is omitted for the clarity of the illustrations. In this case, the sheet thickness of the steel sheet component 8 is 0.65 mm, and the steel sheet component 8 is a general high-tensile steel sheet. FIG. 7A is an illustration of an initial stage of energization at which the welding current is caused to flow in the pressing state illustrated in FIG. 2, and an illustration of a state in which the vicinity of the vertex 7 and the steel sheet component 8 corresponding thereto (circular sheet portion 8A) are slightly fused. The fused portion is denoted by reference numeral 14. The pressurization force exerted by the movable electrode 9 is applied to liquefied fused metal of the fused portion 14, and hence the fused portion 14 is sealed between the initial fusion portion 4A and the unfused portion of the steel sheet component 8.

When pressurization and energization are further continued, along the inclination angle of the tapered portion 6, the fused portion 14 is enlarged into a circular fusion range extending in a diameter direction in a radial and substantially planar manner. A transient state of the enlargement is illustrated in FIG. 7B. Also in this case, the fused portion 14 is sealed between the initial fusion portion 4A and the unfused portion of the steel sheet component 8.

Then, when pressurization and energization are still further continued, subsequently to fusion of the entire initial fusion portion 4A, fusion of the main fusion portion 4B is started simultaneously. As illustrated in FIG. 7C, the fusion of the initial fusion portion 4A causes fusion of an entire surface of the steel sheet component 8 corresponding to the circular range of the initial fusion portion 4A, namely, fusion of a portion close to the surface of the circular sheet portion 8A. At a point in time when the above-mentioned energization time period of eight cycles elapses, a fusion state illustrated in FIG. 7C is attained.

Figure 7D:
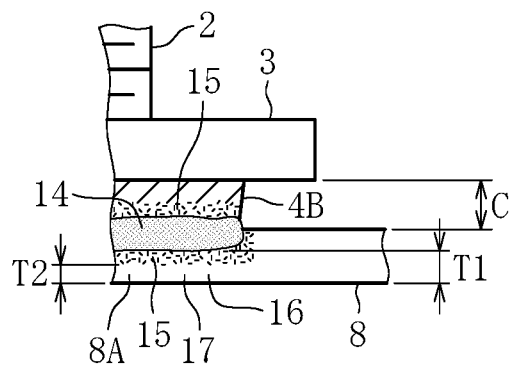
FIG. 7D is a partially enlarged view of FIG. 7C.

As is apparent from FIG. 7C and FIG. 7D, not an entire range of the main fusion portion 4B in a thickness direction, but one-third to a half of the range of the main fusion portion 4B in the thickness direction is fused. The above-mentioned welding conditions, such as the pressurization force, the current value, and the energization time period, are set so that the main fusion portion 4B is fused within this range.

Before fusion, the shape of the initial fusion portion 4A is a flat conical shape as illustrated in the drawings. However, at the initial stage of fusion, the conical shape disappears and transforms into a flat fused region 14 integrated with the fused portion of the surface portion of the steel sheet component 8.

FIG. 7D is a partially enlarged sectional view for illustrating a structural state after completion of fusion bonding. In FIG. 7D, a shaded portion corresponds to the fused portion 14, and corresponds to the above-mentioned nugget. A layered portion appearing near the fused portion 14 corresponds to a structure transformed portion 15, and corresponds to the above-mentioned heat affected zone (HAZ). The structure transformed portion 15 is indicated by the dotted pattern in FIG. 7D.

Reference numeral 16 denotes an unfused portion of the circular sheet portion 8A. The unfused portion is formed of the structure transformed portion 15 and a base material 17 of the steel sheet that is not subjected to a thermal effect, and a thickness of the unfused portion is denoted by T1. Further, a thickness of the base material 17 alone is denoted by T2.

Next, a relationship between the circular area of the initial fusion portion and the steel sheet component is described.

As described above, the sheet thickness of the steel sheet component 8 is 0.65 mm. On the other hand, the circular area of the initial fusion portion 4A is calculated as 63.59 mm² based on the diameter dimension of 9 mm illustrated in FIG. 1B. In this case, when a ratio of the circular area of the initial fusion portion to the sheet thickness of the steel sheet component, namely, the "sheet thickness-area ratio" is obtained, the "sheet thickness-area ratio" is 97.83. Further, when the sheet thickness is changed from 0.65 mm to 0.7 mm and then the "sheet thickness-area ratio" is obtained, the "sheet thickness-area ratio" is 90.81.

The bolt having the above-mentioned "sheet thickness-area ratio" of 77.83 was welded under the above-mentioned welding conditions, specifically, the pressurization force of 2,300 N, the welding current of 14,000 A, and the energization time period of eight cycles. As a result, the thickness T1 of the unfused portion 16 was 0.62 mm, and the thickness T2 of the base material 17 was 0.55 mm. Further, the bolt having the "sheet thickness-area ratio" of 90.81 was welded to the steel sheet component having the sheet thickness of 0.7 mm under the same conditions as the above-mentioned welding conditions. As a result, the thickness T1 of the unfused portion 16 was 0.55 mm, and the thickness T2 of the base material 17 was 0.48 mm. Those values can be read from a graph shown in FIG. 9, which is described later.

Next, specific values of the thicknesses T1 and T2 are described.

Figure 9:
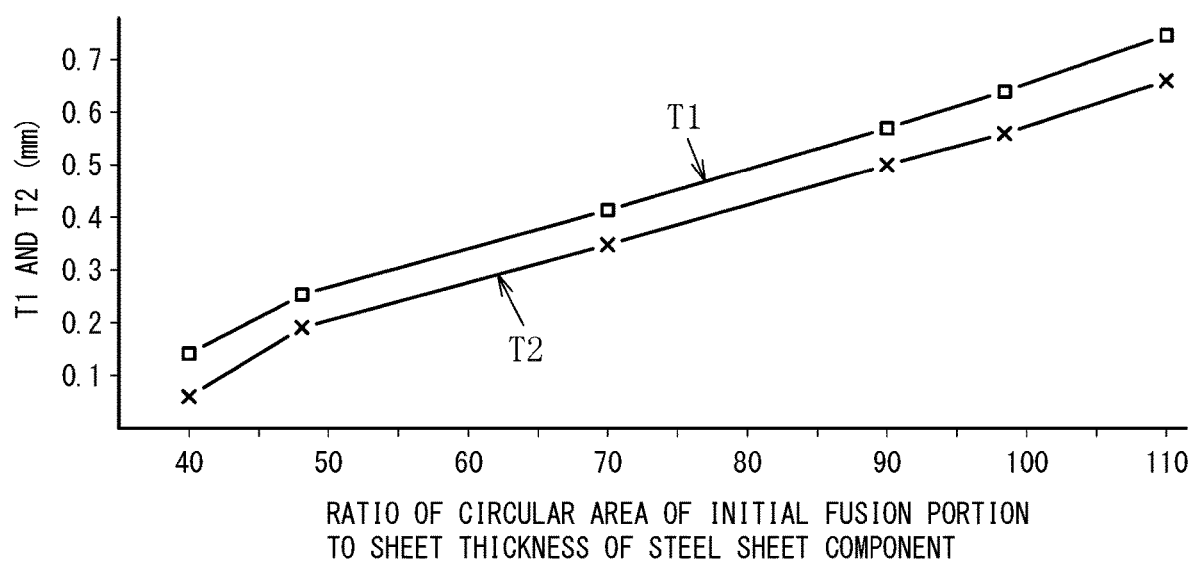
FIG. 9 is a graph for showing a relationship between the "sheet thickness-area ratio" and thicknesses T1 and T2.

FIG. 9 is a graph for showing a relationship between the thickness T1 or T2 and the ratio of the circular area of the initial fusion portion to the sheet thickness of the steel sheet component ("sheet thickness-area ratio"). The thicknesses T1 and T2 when the "sheet thickness-area ratio" is 90.81 or 97.83 are described above. When those values are shown, a penetration amount of the steel sheet component 8 in the thickness direction and the thickness of the base material 17 are proper.

Simultaneously with ensuring of the above-mentioned values of the thicknesses T1 and T2, after completion of the welding, a clearance C having a size large enough to prevent air bubbles from being sealed therein due to a coating liquid is secured between a vicinity of an outer periphery of the enlarged diameter portion 3 and the surface of the steel sheet component 8. The size of the clearance C is 0.5 mm. Further, the welding conditions such as the pressurization force, the current value, and the energization time period are changed, thereby being capable of adjusting the size of the clearance C to 0.4 mm, 0.6 mm, or the like.

Next, a magnitude of the "sheet thickness-area ratio" and progress of fusion are described.

Figure 8A:
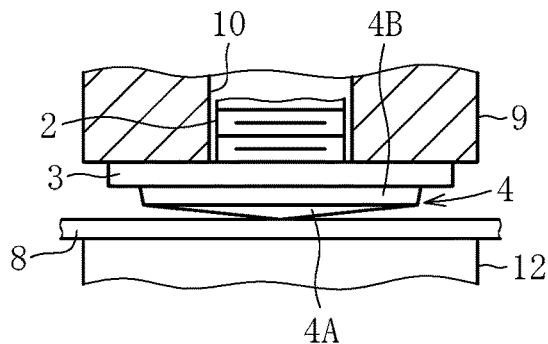
FIG. 8A is a sectional view for illustrating a state before welding is performed when a "sheet thickness-area ratio" is large.
Figure 8B:
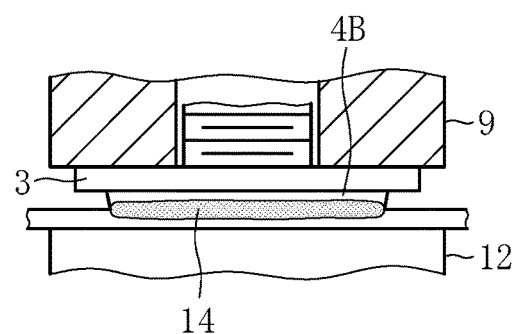
FIG. 8B is a sectional view for illustrating a state after the bolt and the steel sheet member illustrated in FIG. 8A are welded to each other.
Figure 8C:
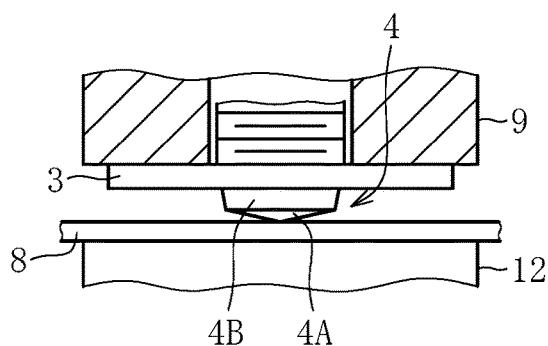
FIG. 8C is a sectional view for illustrating a state before welding is performed when the "sheet thickness-area ratio" is small.
Figure 8D:
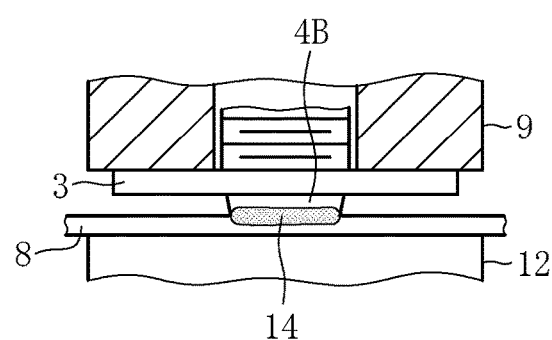
FIG. 8D is a sectional view for illustrating a state after the bolt and the steel sheet member illustrated in FIG. 8C are welded to each other.

In FIG. 8A and FIG. 8B, the diameter of the initial fusion portion 4A is 9 mm, the sheet thickness is 0.7 mm, and the "sheet thickness-area ratio" is 90.81. As described above, the thickness T1 of the unfused portion 16 is 0.55 mm, and the thickness T2 of the base material 17 is 0.48 mm. In FIG. 8C and FIG. 8D, the diameter of the initial fusion portion is 6.5 mm, the sheet thickness is 0.7 mm, and the "sheet thickness-area ratio" is 47.38. The thickness T1 of the unfused portion 16 is 0.24 mm, and the thickness T2 of the base material 17 is 0.18 mm. Note that, FIG. 8A to FIG. 8D are sectional views, but hatching is omitted for easy understanding.

A fusion process from FIG. 8A to FIG. 8B is the same as that described with reference to FIG. 7A to FIG. 7D. The fused portion 14 is sealed between the main fusion portion 4B and the unfused portion 16 of the steel sheet, and the movable electrode 9 is moved forward to perform pressurization, with the result that pressure of the fused metal is kept high. In this case, the circular area of the initial fusion portion 4A is much larger than the circular area illustrated in FIG. 8C and FIG. 8D, and hence the pressure of the fused metal is kept low. Owing to the pressure condition, progress of the fusion in the sheet thickness direction of the steel sheet is slowed down, and excessive fusion is avoided. That is, in the fusion process from FIG. 8A to FIG. 8B, the ratio of the fusion area to the sheet thickness of the steel sheet is large. The fused metal having the wide area and region is pressurized, and hence the internal pressure of the liquefied metal is kept low. Accordingly, the amount of heat transferred from the fused metal to the unfused portion of the steel sheet per unit area is reduced, and the penetration amount in the sheet thickness direction of the unfused portion is small.

A fusion process from FIG. 8C to FIG. 8D is the same as that described with reference to FIG. 7A to FIG. 7D. The fused portion 14 is sealed between the main fusion portion 4B and the unfused portion 16 of the steel sheet, and the movable electrode 9 is moved forward to perform pressurization, with the result that pressure of the fused metal is kept high. In this case, the circular area of the initial fusion portion 4A is much smaller than the circular area illustrated in FIG. 8A and FIG. 8B, and hence the pressure of the fused metal is kept high. Owing to the pressure condition, progress of fusion in the sheet thickness direction of the steel sheet is accelerated, and a large fusion depth is obtained. That is, in the fusion process from FIG. 8C to FIG. 8D, the ratio of the fusion area to the sheet thickness of the steel sheet is small. The fused metal having the small area and region is pressurized, and hence the internal pressure of the liquefied metal is kept high. Accordingly, the amount of heat transferred from the fused metal to the unfused portion of the steel sheet per unit area is increased, and the penetration amount in the sheet thickness direction of the unfused portion is large.

Next, a proper range of the "sheet thickness-area ratio" is described.

As described with reference to FIG. 10A and FIG. 10B, with regard to the sheet thickness of the steel sheet component, it is important to prevent abnormal fusion, namely, fusion in the entire sheet thickness, and to obtain a proper fusion depth. Thus, a range intended for the sheet thickness is from 0.6 mm to 1 mm. The steel sheet having a thickness of 0.6 mm was subjected to welding under a condition that the "sheet thickness-area ratio" was set within a range of from 45 to 105. As a result, satisfactory values were able to be obtained as the thicknesses T1 and T2. Further, the steel sheet having a thickness of 1 mm was subjected to welding under a condition that the "sheet thickness-area ratio" was set within the range of from 45 to 105. As a result, satisfactory values were able to be obtained as the thicknesses T1 and T2.

When the "sheet thickness-area ratio" is smaller than 45, which corresponds to an upper limit predetermined value of the fusion amount of the steel sheet component in the sheet thickness direction obtained depending on the magnitude of the pressure of the fused metal, as described with reference to FIG. 8C and FIG. 8D, the pressure of the liquefied fused metal is kept extremely high. Accordingly, penetration in the sheet thickness direction of the steel sheet is progressed extremely, and hence the thicknesses T1 and T2 are extremely small or reduced to substantially zero. Therefore, it is proper to set the above-mentioned upper limit predetermined value to be smaller than 45.

On the other hand, when the "sheet thickness-area ratio" exceeds 105 to be equal to or larger than 106, which corresponds to a lower limit predetermined value of the fusion amount of the steel sheet component in the sheet thickness direction obtained depending on the magnitude of the pressure of the fused metal, as described with reference to FIG. 8A and FIG. 8B, the pressure of the liquefied fused metal is kept extremely low. Accordingly, penetration in the sheet thickness direction of the steel sheet is extremely slow, and hence the thicknesses T1 and T2 are extremely large. Therefore, it is proper to set the above-mentioned lower limit predetermined value so as not to exceed 105.

Note that, the focus is placed on the above-mentioned matter that the pressure of the liquefied metal is changed depending on the magnitude of the "sheet thickness-area ratio", but the applicant may not measure the pressure of the liquefied metal at the time of welding. Accordingly, operations and effects are described in view of a relationship between the magnitude of the pressure and a degree of progress of the fusion of the steel sheet.

Welding strength tests were conducted on the bolt 1 that was subjected to welding under the above-mentioned condition that the "sheet thickness-area ratio" was set to 90.81 or 97.83. As illustrated in FIG. 6, there was conducted a test of pulling the bolt 1 in the axial direction under a state in which the steel sheet component 8 was fixed by a jig (not shown). As a result, the base material 17 and the fused portion 14 were sheared off the steel sheet component 8 so that the bolt broke, and it was recognized that a cut-out hole 8B corresponding to the circular sheet portion 8A was formed. Thus, it is determined that sufficient welding strength is obtained. This breakage occurs when the pulling force is in a range of from 3,000 N to 3,500 N.

Further, there was conducted a bending test of inclining the shank 2 repeatedly. As a result, a fracture did not occur at the boundary portion between the fused portion 14 and the structure transformed portion 15, at the structure transformed portion 15 itself, or at the boundary portion between the structure transformed portion 15 and the base material 17. Based on those results, it is determined that sufficient welding strength is obtained when the bolt 1 having this size is welded to the steel sheet component 8 having an extremely small thickness of 0.65 mm.

Further, the welding strength tests were conducted on the bolt 1 that was subjected to welding under the above-mentioned condition that the "sheet thickness-area ratio" was set to 47.38. As a result, satisfactory values were able to be obtained both in the tensile test and the repeated bending test.

For example, the welding conditions such as the pressurization force, the current value, and the energization time period are changed within the above-mentioned range under the condition that the "sheet thickness-area ratio" is 97.83. Thus, for example, the thickness T1=0.62 mm is adjustable to the thickness T1=0.53 mm, and the thickness T2=0.55 mm is adjustable to the thickness T2=0.44 mm.

In the second embodiment, the shape of the initial fusion portion 4A is a conical shape including the tapered portion 6 and the vertex 7, but a spherical shape may be employed instead of the conical shape. In a case of the spherical shape, a portion corresponding to the vertex 7 is pressurized against the steel sheet component 8, and fusion is started from the pressurized portion. The other fusion bonding process is performed similarly to the case of the conical shape.

Operations and effects of the second embodiment obtained based on the "pressure use" described above are as follows.

When the ratio of the circular area of the initial fusion portion 4A to the sheet thickness of the steel sheet component 8 ("sheet thickness-area ratio") is set to, for example, 100, a ratio of the fusion area to the sheet thickness of the steel sheet 8 is large. The fused metal 14 having the wide area and region is pressurized, and hence the internal pressure of the liquefied metal is kept low. Accordingly, an amount of heat transferred from the fused metal 14 to the unfused portion 16 of the steel sheet 8 per unit area is reduced, and the penetration amount in the sheet thickness direction of the unfused portion 16 is small. Further, the fusion range in a surface direction of the steel sheet 8 is large, and hence fusion heat is transferred from a long fusion outer peripheral edge to the wide region. Consequently, the amount of heat transferred in the sheet thickness direction is reduced, and progress of penetration in the sheet thickness direction is slowed down. Therefore, when the above-mentioned ratio of the circular area of the initial fusion portion 4A to the sheet thickness of the steel sheet component 8 is set as large as 100, progress of penetration in the sheet thickness direction is slowed down, and excessive fusion can be prevented. Thus, welding strength of the projection bolt 1 is maintained properly.

When the above-mentioned "sheet thickness-area ratio" is set to, for example, 50, the ratio of the fusion area to the sheet thickness of the steel sheet 8 is small. The fused metal 14 having the small area and region is pressurized, and hence the internal pressure of the liquefied metal is kept high. Accordingly, the amount of heat transferred from the fused metal 14 to the unfused portion 16 of the steel sheet 8 per unit area is increased, and the penetration amount in the sheet thickness direction of the unfused portion 16 is large. Further, the fusion range in the surface direction of the steel sheet 8 is small, and hence fusion heat is transferred from a short fusion outer peripheral edge to the small region. Consequently, the amount of heat transferred in the sheet thickness direction is increased, and progress of penetration in the sheet thickness direction is accelerated. Therefore, when the above-mentioned "sheet thickness-area ratio" is set as small as 50, progress of penetration in the sheet thickness direction is accelerated, and a large fusion depth is obtained. Thus, welding strength of the projection bolt 1 is maintained properly.

The above-mentioned phenomena cause a state in which the fused metal 14 is sealed between the initial fusion portion 4A and the unfused portion 16 of the steel sheet 8 at the initial stage of fusion, whereas the fused metal 14 is sealed between the main fusion portion 4B and the unfused portion 16 of the steel sheet at the latter stage of fusion. Accordingly, a pressure condition of the liquefied metal influences progress of fusion in the unfused portion 16. That is, such phenomena are important that heat is actively conducted from the high-pressure fused metal to the unfused portion 16, whereas heat is slowly conducted from the low-pressure fused metal to the unfused portion 16. The phenomena as described above occur as in the case of the above-mentioned examples based on the "sheet thickness-area ratio", and hence excessive fusion and extremely insufficient fusion in the sheet thickness direction can be prevented. Thus, proper welding strength can be ensured.

In order to obtain a proper fusion amount of the steel sheet component in the sheet thickness direction, it is practically important to specify the numerical values such as 100 and 50 as the above-mentioned "sheet thickness-area ratio". However, the selection of those values is based on the basic phenomenon involving the "pressure use".

INDUSTRIAL APPLICABILITY

The method according to the present invention involves the "fusion heat addition" or the "pressure use" described above. Accordingly, the excessive fusion and the extremely insufficient fusion of the steel sheet can be prevented, thereby being capable of subjecting the bolt to electric resistance welding in a satisfactory state. Thus, the present invention is applicable in a wide variety of industrial fields such as a process of welding a body of an automobile and a process of welding a metal plate of a home appliance.

REFERENCE SIGNS LIST 1 projection bolt
2 shank
3 enlarged diameter portion
4 welding projection
4A initial fusion portion
4B main fusion portion
6 tapered portion
7 vertex
8 steel sheet component
8A circular sheet portion
8B cut-out hole
14 fused portion (fused metal or fused region)
15 structure transformed portion (heat affected zone)
16 unfused portion
17 base material portion
T1 thickness dimension of unfused portion
T2 thickness dimension of base material portion
C clearance

The invention claimed is:

1. A projection bolt welding method comprising:
preparing a projection bolt comprising a shank having an external thread formed therein, a circular enlarged diameter portion being formed integrally with the shank and having a diameter larger than a diameter of the shank, and a circular welding projection arranged at a center of the circular enlarged diameter portion on a side opposite to the shank, wherein the circular enlarged diameter portion has a surface surrounding the circular welding projection on the side opposite to the shank, and the circular welding projection comprises a main fusion portion formed on the circular enlarged diameter portion on the side opposite to the shank, and a circular initial fusion portion continuous with the main fusion portion and having a tapered portion that is reduced in height as approaching to an outer peripheral side of the circular initial fusion portion at an inclination angle;
preparing a pair of electrodes comprising an electrode for holding the projection bolt and an electrode on which a steel sheet component is to be placed, the pair of electrodes being arranged coaxially with each other;
welding the projection bolt to the steel sheet component by electric resistance welding while pressurizing the circular welding projection of the projection bolt against the steel sheet component between the pair of electrodes such that, upon completion of the welding at which welding energization and the pressurizing of the circular welding projection of the projection bolt against the steel sheet component are stopped, a portion of the main fusion portion remains unfused and forms a clearance between the surface of the circular enlarged diameter portion surrounding the circular welding projection and a surface of the steel sheet component facing the surface of the circular enlarged diameter portion,
wherein the preparing of the projection bolt comprises setting a rate of a circular area of the circular initial fusion portion to a sheet thickness of the steel sheet component of 45 to 105.

2. The projection bolt welding method of claim 1, wherein the surface of the circular enlarged diameter portion surrounding the circular welding projection is perpendicular to a central axis of the projection bolt.

3. The projection bolt welding method of claim 1, wherein the clearance is 0.4 mm-0.6 mm.

* * * * *